United States Patent
Nakano et al.

(10) Patent No.: US 8,465,217 B2
(45) Date of Patent: Jun. 18, 2013

(54) FOCAL-PLANE SHUTTER AND OPTICAL EQUIPMENT

(75) Inventors: Yoichi Nakano, Chiba (JP); Hideki Tanaka, Chiba (JP)

(73) Assignee: Seiko Precision Inc., Narashino-shi (JP)

( * ) Notice: Subject to any disclaimer, the term of this patent is extended or adjusted under 35 U.S.C. 154(b) by 0 days.

(21) Appl. No.: 13/608,202

(22) Filed: Sep. 10, 2012

(65) Prior Publication Data

US 2012/0328280 A1 Dec. 27, 2012

Related U.S. Application Data

(63) Continuation of application No. PCT/JP2011/062654, filed on Jun. 2, 2011.

(30) Foreign Application Priority Data

Sep. 14, 2010 (JP) .................................. 2010-206013

(51) Int. Cl.
*G03B 9/40* (2006.01)
(52) U.S. Cl.
USPC .......................................................... 396/489
(58) Field of Classification Search
USPC ................. 396/452, 456, 471, 483–488, 489, 396/490
See application file for complete search history.

(56) References Cited

U.S. PATENT DOCUMENTS

| | | | |
|---|---|---|---|
| 2007/0237518 A1* | 10/2007 | Ichihara et al. | 396/466 |
| 2010/0158504 A1* | 6/2010 | Moriyama et al. | 396/479 |
| 2010/0284685 A1* | 11/2010 | Ichihara et al. | 396/466 |
| 2012/0213505 A1* | 8/2012 | Takahashi et al. | 396/489 |

FOREIGN PATENT DOCUMENTS

| | | |
|---|---|---|
| JP | 2004-317589 A1 | 11/2004 |
| JP | 2004-317590 A1 | 11/2004 |
| JP | 2005-70454 A1 | 3/2005 |
| JP | 2010-152000 A1 | 7/2010 |

OTHER PUBLICATIONS

International Search Report for International Application No. PCT/JP2011/062654 dated Aug. 2, 2011.
Japanese Office Action of the corresponding Japanese patent application dated Aug. 28, 2012 (5 Sheets).

* cited by examiner

*Primary Examiner* — Clayton E LaBalle
*Assistant Examiner* — Warren K Fenwick
(74) *Attorney, Agent, or Firm* — Kratz, Quintos & Hanson, LLP

(57) ABSTRACT

A focal-plane shutter includes: a board including an opening; a leading blade and a trailing blade; a trailing blade lever; a first lever; a second lever; a self-holding type solenoid; a leading blade electromagnet and a trailing blade electromagnet; and a set lever.

7 Claims, 18 Drawing Sheets

FOCAL-PLANE SHUTTER AND OPTICAL EQUIPMENT

CROSS-REFERENCE TO RELATED APPLICATION

This application is a continuation of and claims priority to International Patent Application No. PCT/JP2011/062654 filed on Jun. 2, 2011, which claims priority to Japanese Patent Application No. 2010-206013 filed on Sep. 14, 2010, subject matter of these patent documents is incorporated by reference herein in its entirety.

BACKGROUND (i) Technical Field

The present invention relates to focal-plane shutters and optical equipment.

(ii) Related Art

Japanese Unexamined Patent Application Publication No. 2004-317589 discloses a focal-plane shutter providing with a leading blade electromagnet, a trailing blade electromagnet, and an actuator capable of holding a lever opening and closing a leading blade in an non-energized state.

The actuator disclosed in Japanese Unexamined Patent Application Publication No. 2004-317589 includes a stator, a coil, and a rotor. Thus, the provision of such an actuator might increase a size of the focal-plane shutter itself.

SUMMARY

It is therefore an object of the present invention to provide focal-plane shutters and optical equipment suppressing an increase in size thereof.

According to an aspect of the present invention, there is provided a focal-plane shutter including: a board including an opening; a leading blade and a trailing blade capable of opening and closing the opening; a trailing blade lever capable of driving the trailing blade; a first lever connected to the leading blade and capable of driving the leading blade; a second lever arranged coaxially with the first lever, and having an engagement portion abutting with the first lever to push the first lever such that the leading blade opens the opening; a self-holding type solenoid capable of holding the first lever such that the leading blade opens the opening in a state where the self-holding type solenoid is not energized; a leading blade electromagnet and a trailing blade electromagnet respectively capable of holding the second lever and the trailing blade lever in a state where the leading blade electromagnet and the trailing blade electromagnet are energized; and a set lever setting the second lever and the trailing blade lever such that the second lever and the trailing blade lever respectively abut with the leading blade electromagnet and the trailing blade electromagnet, wherein a first mode, where the second lever and the trailing blade lever are set in a state where the leading blade and the trailing blade open the opening, or a second mode, where the second lever and the trailing blade lever are set in a state where the leading blade closes the opening and the trailing blade opens the opening, is selectively switched.

DETAILED DESCRIPTION

A present embodiment according to the present invention will be described below with reference to drawings.

Figure 1:
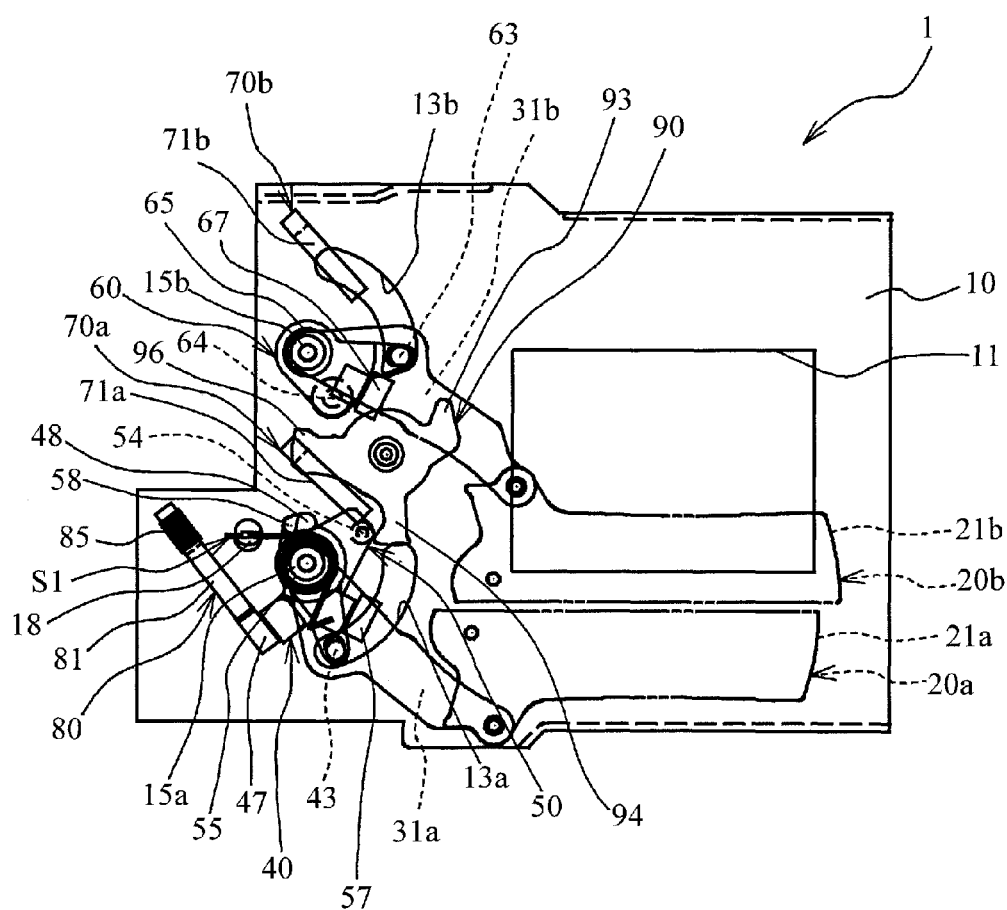
FIG. 1 is a front view of a focal-plane shutter according to a present embodiment.

FIG. 1 is a front view of a focal-plane shutter according to the present embodiment. As illustrated in FIG. 1, a focal-plane shutter 1 includes: a board 10; a leading blade 20a; a trailing blade 20b; arms 31a and 31b; a first lever 40; a second lever 50; a trailing blade drive lever 60; a leading blade electromagnet (hereinafter referred to as electromagnet) 70a; a trailing blade electromagnet (hereinafter referred to as electromagnet) 70b; a self-holding type solenoid (hereinafter referred to as solenoid) 80; and a set lever 90. The board 10 is made of a synthetic resin. The board 10 includes an opening 11 having a substantially rectangular shape.

The leading blade 20a includes four blades, but a single blade 21a is illustrated in drawings. Likewise, the trailing blade 20b includes four blades, but a single blade 21b is illustrated in the drawings. Additionally, each of the leading blade 20a and the trailing blade 20b may include five, three, or two blades. FIG. 1 illustrates the leading blade 20a in an overlapped state and the trailing blade 20b in an expanded state. In FIG. 1, the leading blade 20a recedes from the opening 11 to open the opening 11, and the trailing blade 20b closes the opening 11.

As illustrated in FIG. 1, the leading blade 20a is coupled to two arms, but a single arm 31a is illustrated in the drawings. Likewise, the trailing blade 20b is coupled to two arms, but a single arm 31b is illustrated in the drawings. These arms 31a and 31b are each swingably supported by the board 10.

As illustrated in FIG. 1, the first lever 40 for driving the arm 31a, the second lever 50, and the trailing blade drive lever 60 for driving the arm 31b are provided on the board 10. The first lever 40 and the second lever 50 will be described later. The trailing blade drive lever 60 includes a pipe portion 65. The pipe portion 65 rotatably fits onto a spindle portion 15b formed on the board 10. Thus, the trailing blade drive lever 60 is swingably supported by the board 10 in a predetermined range. The trailing blade drive lever 60 is provided with a drive pin 63. The board 10 is provided with an escape slot 13b for allowing the movement of the drive pin 63. The escape slot 13b has an arc shape. The drive pin 63 fits into a fitting hole of the arm 31b. Swinging of the trailing blade drive lever 60 causes the arm 31b to swing, whereby the trailing blade 20b moves.

The trailing blade drive lever 60 holds a movable iron piece 67. The trailing blade drive lever 60 can swing between a position where the movable iron piece 67 abuts with the electromagnet 70b and a position where the movable iron piece 67 recedes from the electromagnet 70b. A biasing spring, not illustrated, fits around the pipe portion 65. The biasing spring biases the trailing blade drive lever 60 in such a direction that the movable iron piece 67 moves away from the electromagnet 70b. That is, the biasing spring biases the trailing blade drive lever 60 such that the trailing blade 20b closes the opening 11.

The electromagnet 70b can adsorb the movable iron piece 67, when energized. The electromagnet 70b includes: an iron core 71b; and a coil wound around the iron core 71b to energize the iron core 71b. In the drawing, only the iron core 71b is illustrated. The energization of the coil generates a magnetic attractive force in the iron core 71b, and then the iron core 71b can adsorb the movable iron piece 67. In the state where the movable iron piece 67 abuts with the iron core 71b, the trailing blade 20b opens the opening 11.

Figure 2:
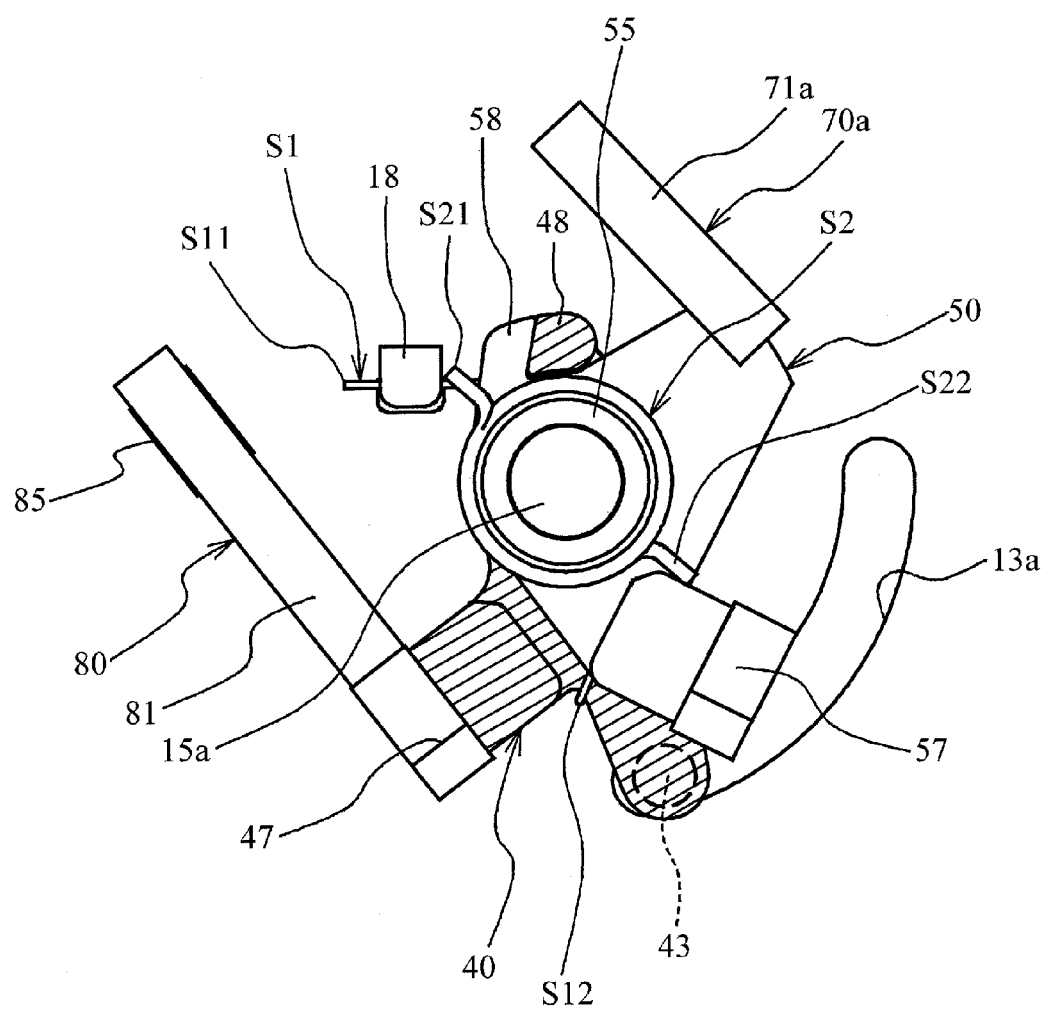
FIG. 2 is an enlarged view around a first lever and a second lever illustrated in FIG. 1.
Figure 3:
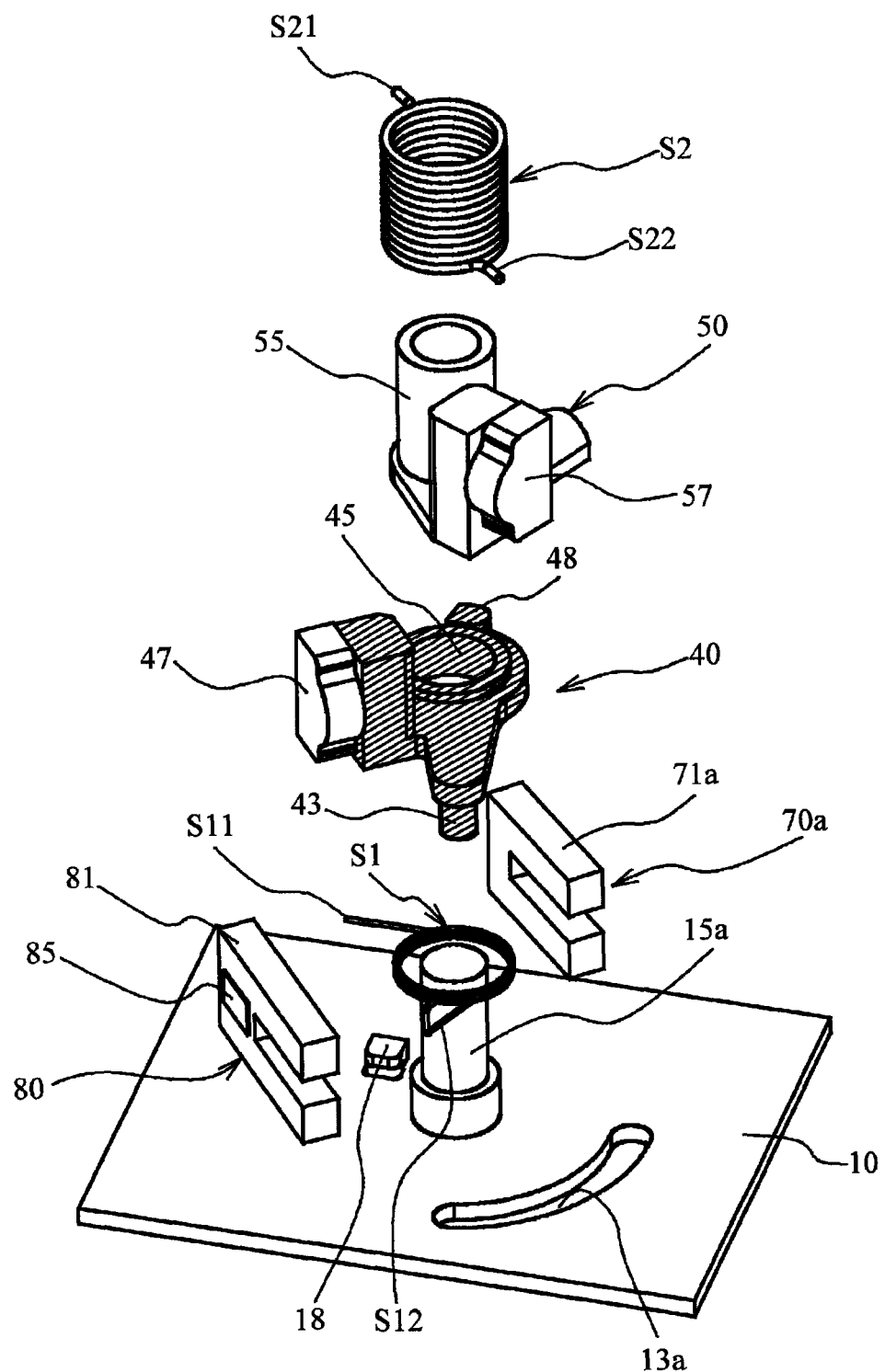
FIG. 3 is an exploded perspective view of a configuration around the first lever and the second lever.
Figure 4:
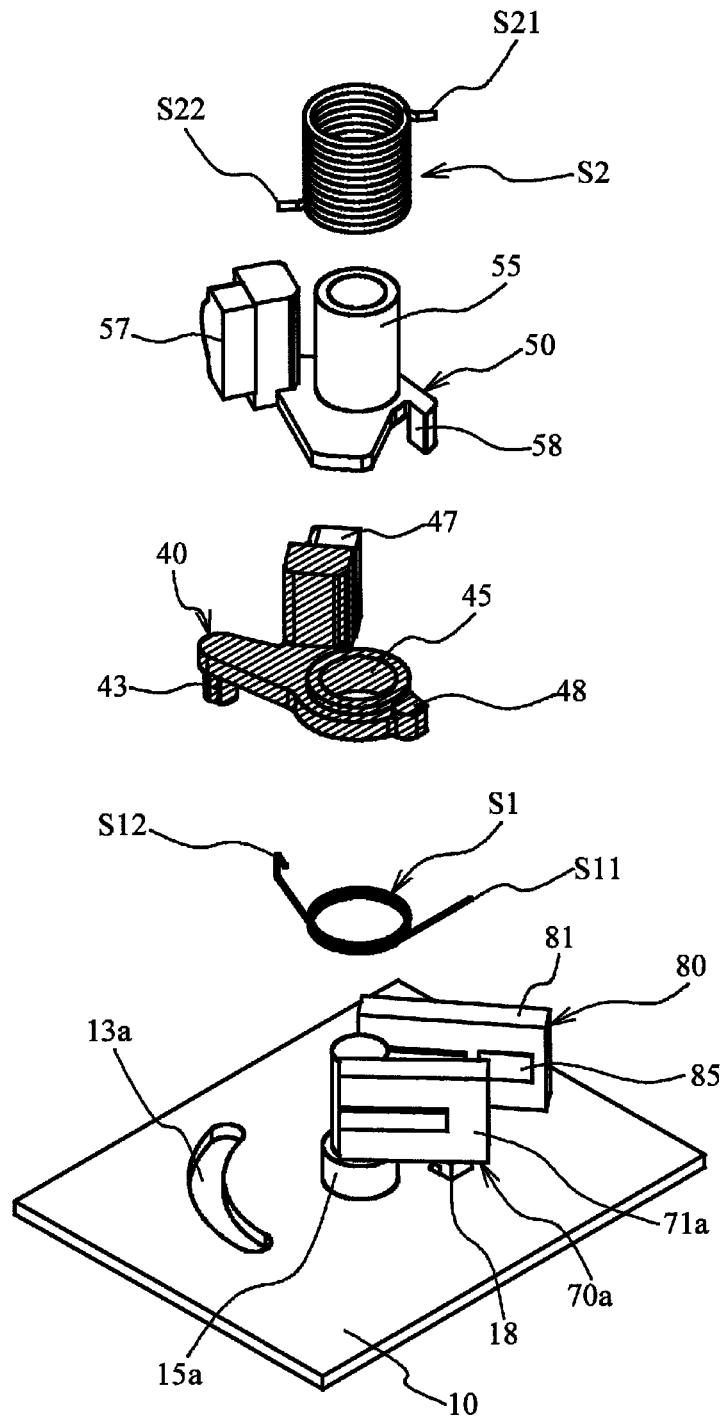
FIG. 4 is an exploded perspective view of the configuration around the first lever and the second lever.
Figure 5:
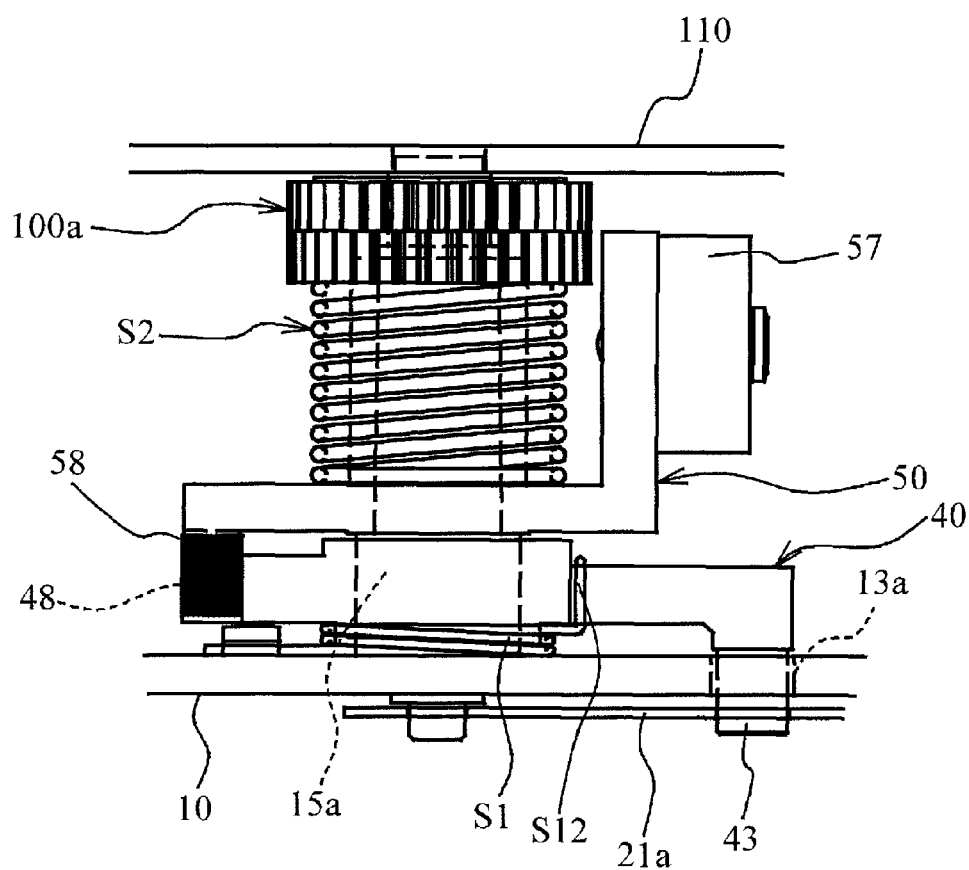
FIG. 5 is a side view of the configuration around the first lever and the second lever.

Next, the first lever 40 and the second lever 50 will be described. FIG. 2 is an enlarged view around the first lever 40 and the second lever 50 illustrated in FIG. 1. FIGS. 3 and 4 are exploded perspective views of a configuration around the first lever 40 and the second lever 50. FIG. 5 is a side view of the configuration around the first lever 40 and the second lever 50. Additionally, in FIGS. 2 to 4, the first lever 40 is hatched.

The first lever 40 includes a drive pin 43 fitted into the arm 31a. The board 10 is formed with an escape slot 13a, having an arc shape, for allowing the drive pin 43. The first lever 40 is formed with a hole 45 through which a spindle portion 15a provided in the board 10 penetrates. Therefore, the first lever 40 rotatably fits onto the spindle portion 15a. The first lever 40 holds a movable iron piece 47.

The spring S1 has a coil shape. One end S11 of the spring S1 engages with an engagement portion 18 formed on the board 10. The other end S12 of the spring S1 is bent to engage with the first lever 40, as illustrated in FIGS. 2 and 5. The spring S1 biases the first lever 40 counterclockwise. In other words, the spring S1 biases the first lever 40 such that the leading blade 20a closes the opening 11. The spring S1 corresponds to a first biasing member. The first lever 40 includes an engagement portion 48 protruding radially outward.

The second lever 50 is arranged coaxially with the first lever 40. Specifically, the second lever 50 rotatably fits onto the common spindle portion 15a onto which the first lever 40 rotatably fits. The second lever 50 includes a pipe portion 55 which rotatably fits onto the spindle portion 15a. The spindle portion 15a fitted into the hole 45 of the first lever 40 and the pipe portion 55 of the second lever 50, so that the first lever 40 and the second lever 50 are arranged coaxially with each other. The second lever 50 holds a movable iron piece 57. The spring S2 is arranged around the pipe portion 55. The spring S2 has a coil shape. A wire diameter of the spring S2 is larger than that of the spring S1, and the full length of the spring S2 is longer than that of the spring S1. An elastic restoring force of the spring S2 is greater than that of the spring S1, under conditions where each deformation amount thereof is the same.

One end S21 of the spring S2 engages with a ratchet wheel 100a illustrated in FIG. 5. The ratchet wheel 100a rotatably fits onto the spindle portion 15a. The ratchet wheel 100a is formed at its outer circumference with plural tooth portions. Further, a holding plate 110 is provided with an engaging pawl which can engage with the tooth portion. The engagement of the engaging pawl with the tooth portion of the ratchet wheel 100a prevents the ratchet wheel 100a from being rotated by the biasing force of the spring S2. That is, the engaging pawl secures the ratchet wheel 100a. The other end S22 engages with the second lever 50 as illustrated in FIG. 2. The spring S2 biases the second lever 50 clockwise. The adjustment of the rotational amount of the ratchet wheel 100a adjusts the biasing force of the spring S2. The spring S2 corresponds to a second biasing member.

The second lever 50 is formed with an engagement portion 58 which can abut with the engagement portion 48 of the first lever 40. When the second lever 50 rotates clockwise with the engagement portion 48 and the engagement portion 58 abutting with each other, the first lever 40 rotates clockwise together with the second lever 50. Also, as for the first lever 40 and the second lever 50, the second lever 50 rotate counterclockwise with respect to the first lever 40 such that the engagement portion 48 and the engagement portion 58 move away from each other.

The electromagnet 70a has substantially the same configuration as the electromagnet 70b, and includes: an iron core 71a; and a coil wound around the iron core 71a to energize the iron core 71a. In drawings, the illustration of the coil is omitted. The iron core 71a has a substantially lateral U-shape. When the coil wound around the iron core 71a is energized, the iron core 71a can adsorb the movable iron piece 57 of the second lever 50.

The solenoid 80 can adsorb the movable iron piece 47 of the first lever 40, when not energized. The solenoid 80 includes: a yoke 81 having a substantially lateral U-shape when viewed from its side; a permanent magnet 85 assembled into the yoke 81; and a coil, not illustrated, wound around the yoke 81. Since the yoke 81 is assembled with the permanent magnet 85, the yoke 81 has given polarities by the influence of the permanent magnet 85. Thus, the solenoid 80 can adsorb the movable iron piece 47 of the first lever 40, when not energized. Also, when the coil wound around the yoke 81 of the solenoid 80 is energized and then the yoke 81 is excited so as to cancel the polarities generated by the influence of the permanent magnet 85, the magnetic attractive force between the yoke 81 and the movable iron piece 47 decreases. Thus, when the coil of the solenoid 80 is energized with the movable iron piece 47 of the first lever 40 abutting with the yoke 81, the attractive magnetic force exerted between the yoke 81 and the movable iron piece 47 is smaller than the biasing force of the spring S1, so that the first lever 40 is rotated counterclockwise by the biasing force of the spring S1 and recedes from the solenoid 80.

Next, the set lever 90 will be described. The set lever 90 is provided for setting the second lever 50 and the trailing blade drive lever 60 such that the second lever 50 and the trailing blade drive lever 60 respectively abut with the electromagnets 70a and 70b. The set lever 90 is rotatably supported by the board 10. The set lever 90 includes a pushed portion 93 pushed by a charge member provided in the camera side. The set lever 90 includes pushing portions 94 and 96. The pushed portion 93, and the pushing portions 94 and 96 protrude outward from the rotational center of the set lever 90. As illustrated in FIG. 1, the second lever 50 and the trailing blade drive lever 60 include rollers 54 and 64, respectively.

The pushed portion 93 is pushed by the charge member of the camera side, so that the set lever 90 rotates clockwise. In response to this, the pushing portions 94 and 96 respectively abut with the rollers 54 and 64 to move the second lever 50 and the trailing blade drive lever 60 counterclockwise. This allows the second lever 50 and the trailing blade drive lever 60 to abut with the electromagnets 70a and 70b, respectively. Additionally, the set lever 90 is attached with a return spring (not illustrated) for returning the set lever 90 to an initial position. The return spring biases the set lever 90 counterclockwise. The set lever 90 illustrated in FIG. 1 is positioned at the initial position. The board 10 is provided with a positioning portion for positioning the set lever 90, which is biased counterclockwise by the return spring, at the initial position.

Next, the operation of the focal-plane shutter 1 will be described. The focal-plane shutter 1 can selectively switch between first and second modes. In the first mode, the second lever 50 and the trailing blade drive lever 60 are set in a state where the leading blade 20a and the trailing blade 20b open the opening 11. In the second mode, the second lever 50 and the trailing blade drive lever 60 are set in a state where the leading blade 20a closes the opening 11 and the trailing blade 20b opens the opening 11. Firstly, the operation of the focal-plane shutter 1 in the first mode will be described.

Figure 6:
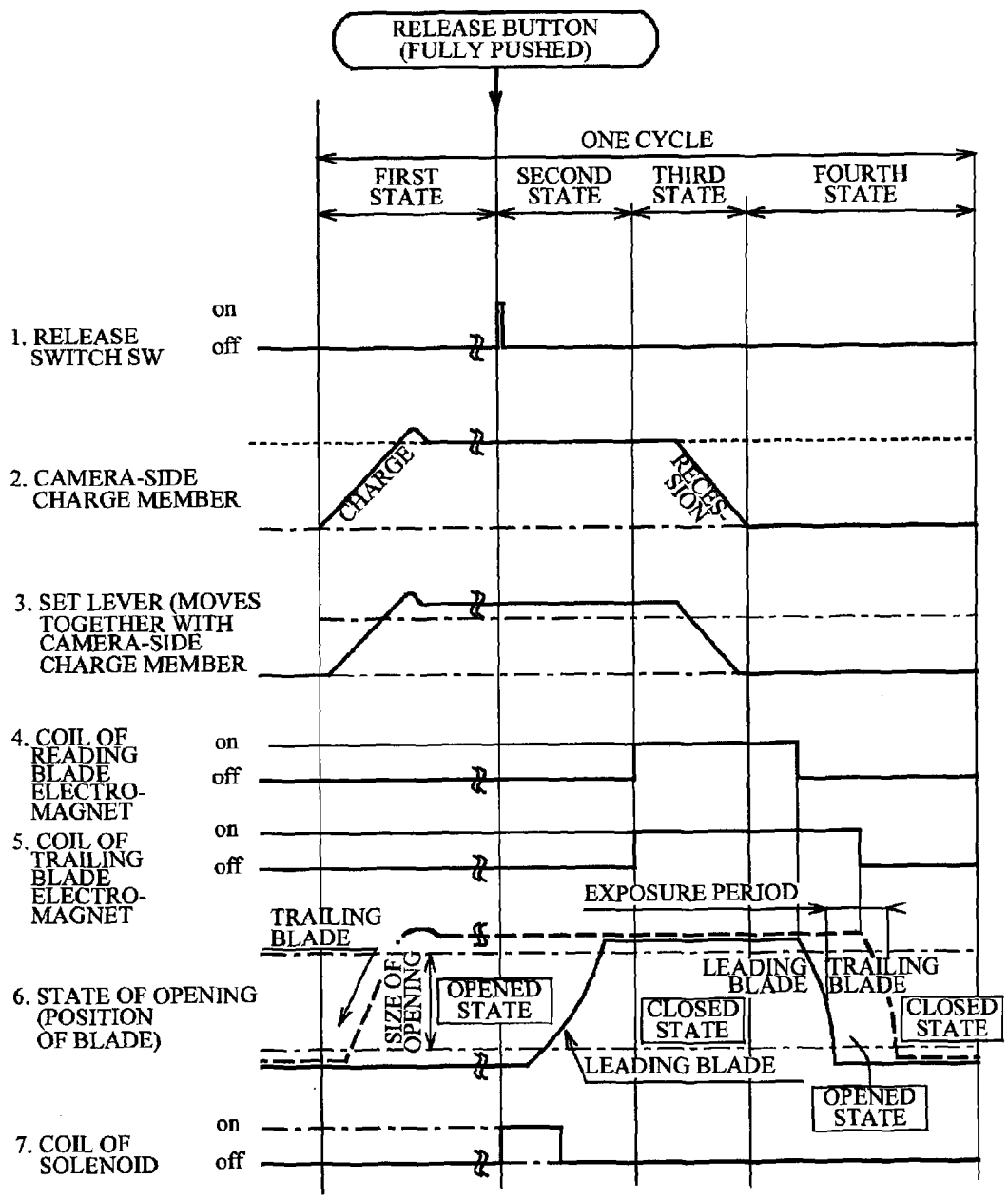
FIG. 6 is a timing chart of a focal-plane shutter in a first mode.
Figure 7:
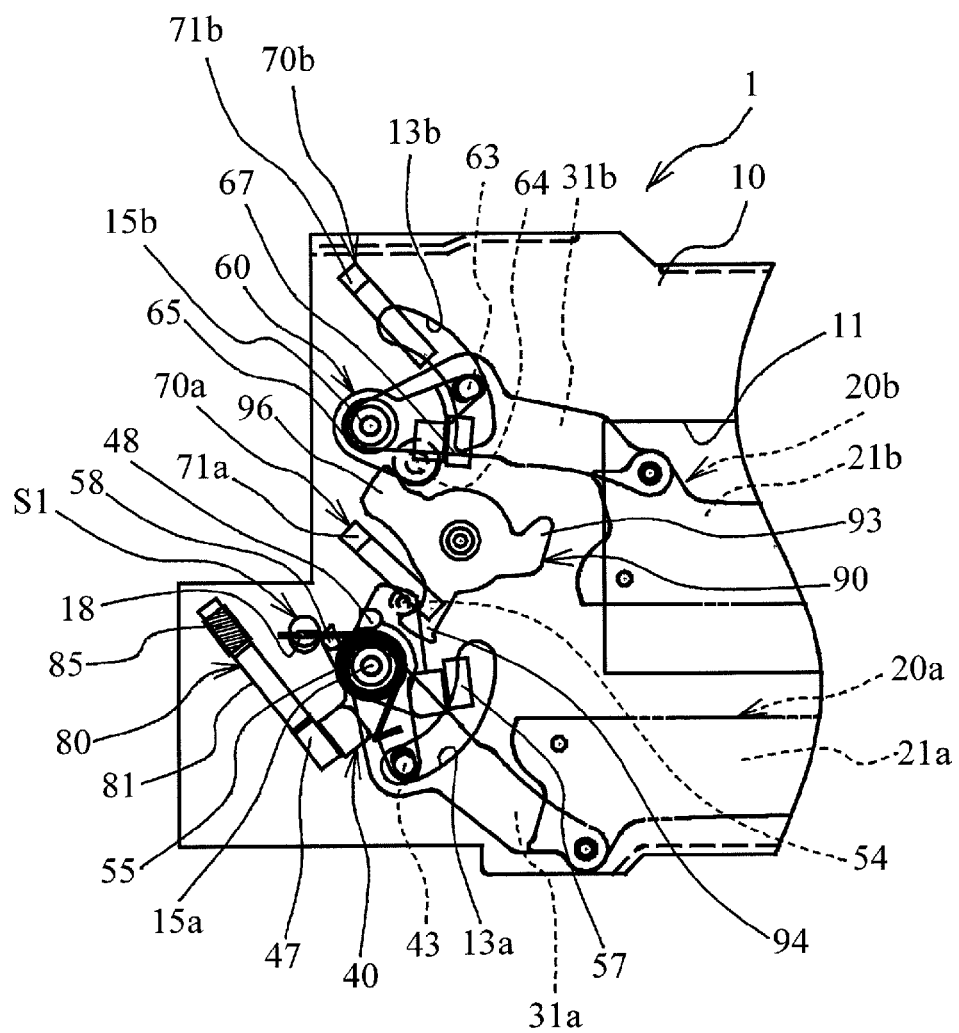
FIG. 7 is an explanatory view of the operation of the focal-plane shutter in the first mode.
Figure 8:
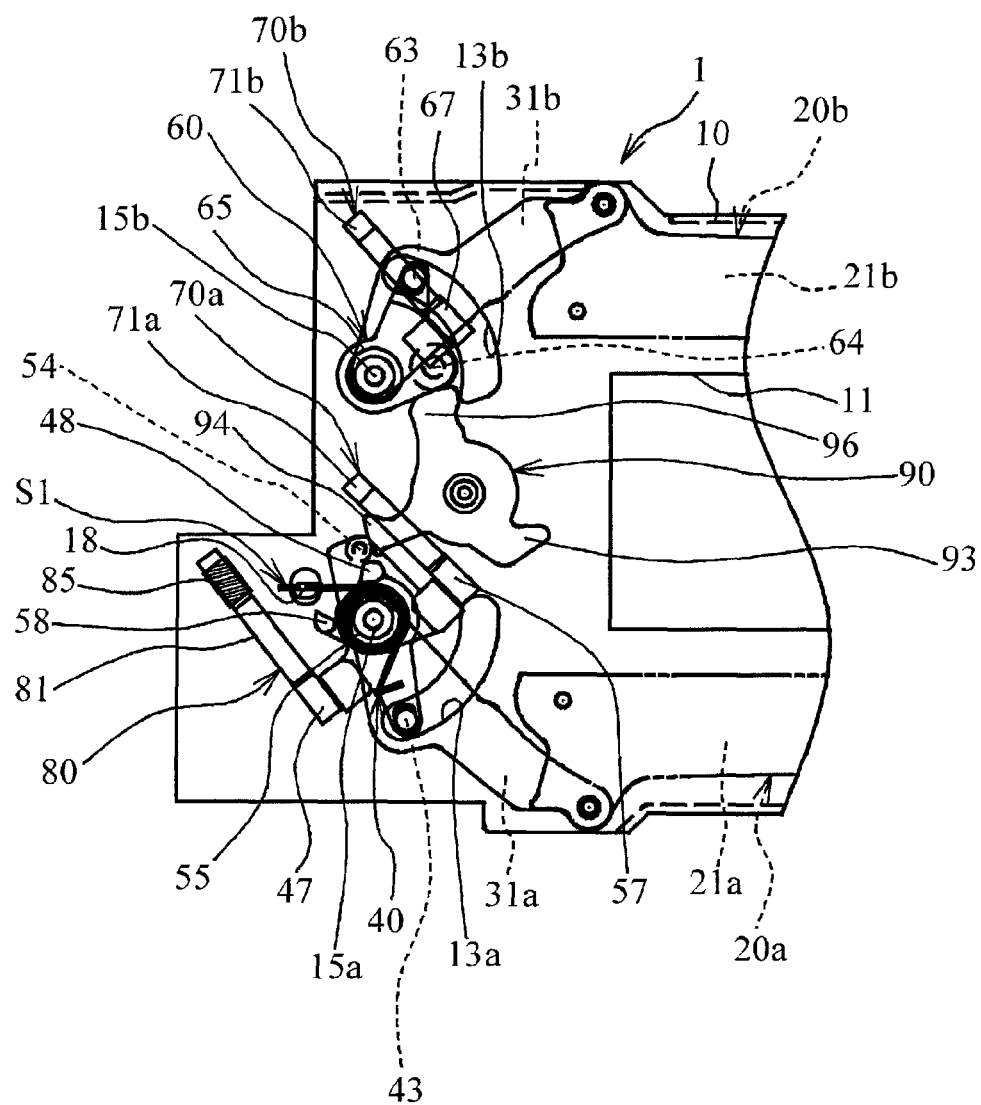
FIG. 8 is an explanatory view of the operation of the focal-plane shutter in the first mode.

The first mode will be described with reference to FIGS. 1, and 6 to 13. FIG. 6 is a timing chart of the focal-plane shutter 1 in the first mode. FIG. 1 illustrates an initial state. In the initial state, the movable iron piece 47 of the first lever 40 is held by the solenoid 80, the leading blade 20a recedes from the opening 11 to open the opening 11, and the trailing blade 20b closes the opening 11. When the set lever 90 is rotated clockwise from the initial state, the pushing portions 94 and 96 of the set lever 90 respectively abut with the roller 54 of the second lever 50 and the roller 64 of the trailing blade drive lever 60 to rotate the second lever 50 and the trailing blade drive lever 60 counterclockwise, as illustrated in FIG. 7. As illustrated in FIG. 8, the set lever 90 rotates the second lever 50 and the trailing blade drive lever 60 counterclockwise until the movable iron piece 57 of the second lever 50 abuts with the electromagnet 70a and the movable iron piece 67 of the trailing blade drive lever 60 abuts with the electromagnet 70b.

Figure 9:
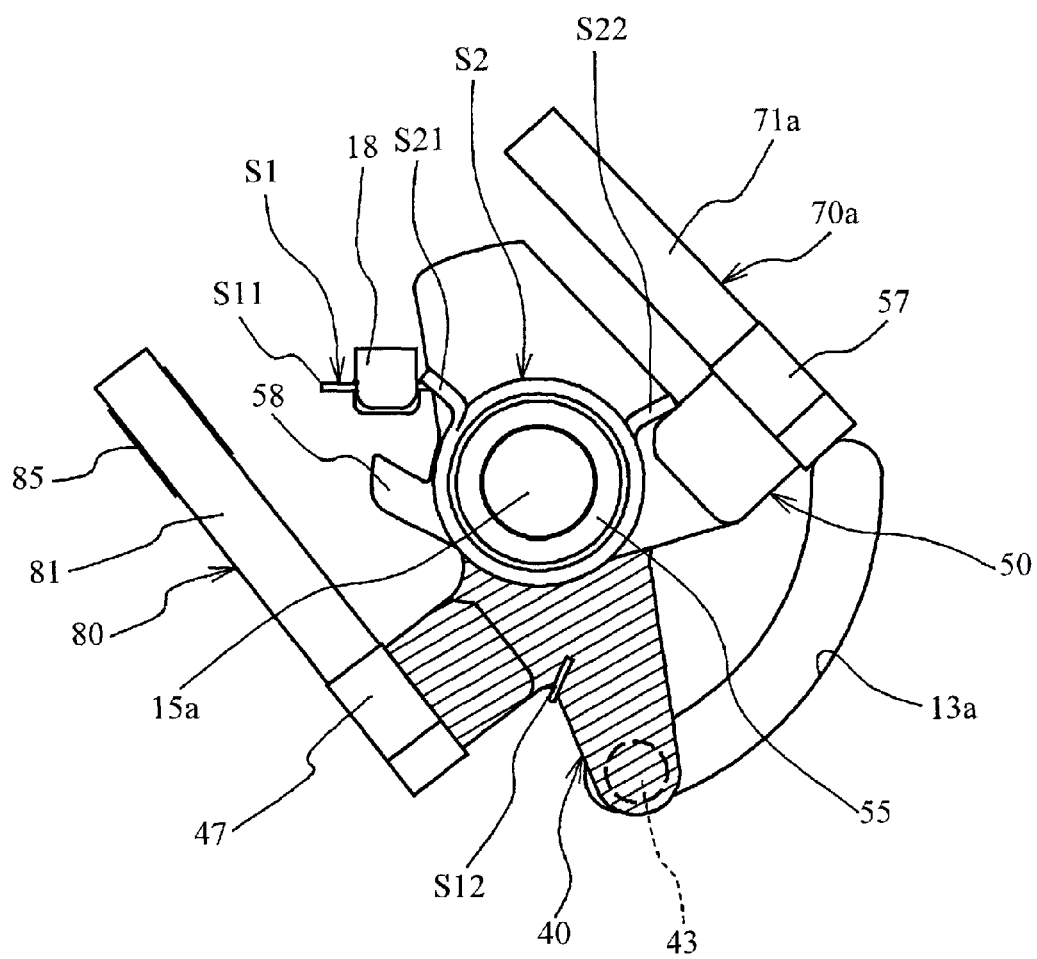
FIG. 9 is an enlarged view around the first lever and the second lever illustrated in FIG. 8.

At this time, the second lever 50 is rotated counterclockwise with the solenoid 80 adsorbing and holding the movable iron piece 47 of the first lever 40. Therefore, as illustrated in FIG. 8, the trailing blade 20b recedes from the opening 11 to open the opening 11, while the leading blade 20a is opening the opening 11. In such a manner, the setting of the second lever 50 and the trailing blade drive lever 60 is finished. FIG. 9 is an enlarged view around the first lever 40 and the second lever 50 in the set state of the first mode. In such a way, the movable iron piece 57 abuts with the electromagnet 70a, whereas the movable iron piece 47 abuts with the solenoid 80. The states illustrated in FIGS. 1, and 7 to 9 correspond to a first state of the timing chart illustrated in FIG. 6.

Figure 10:
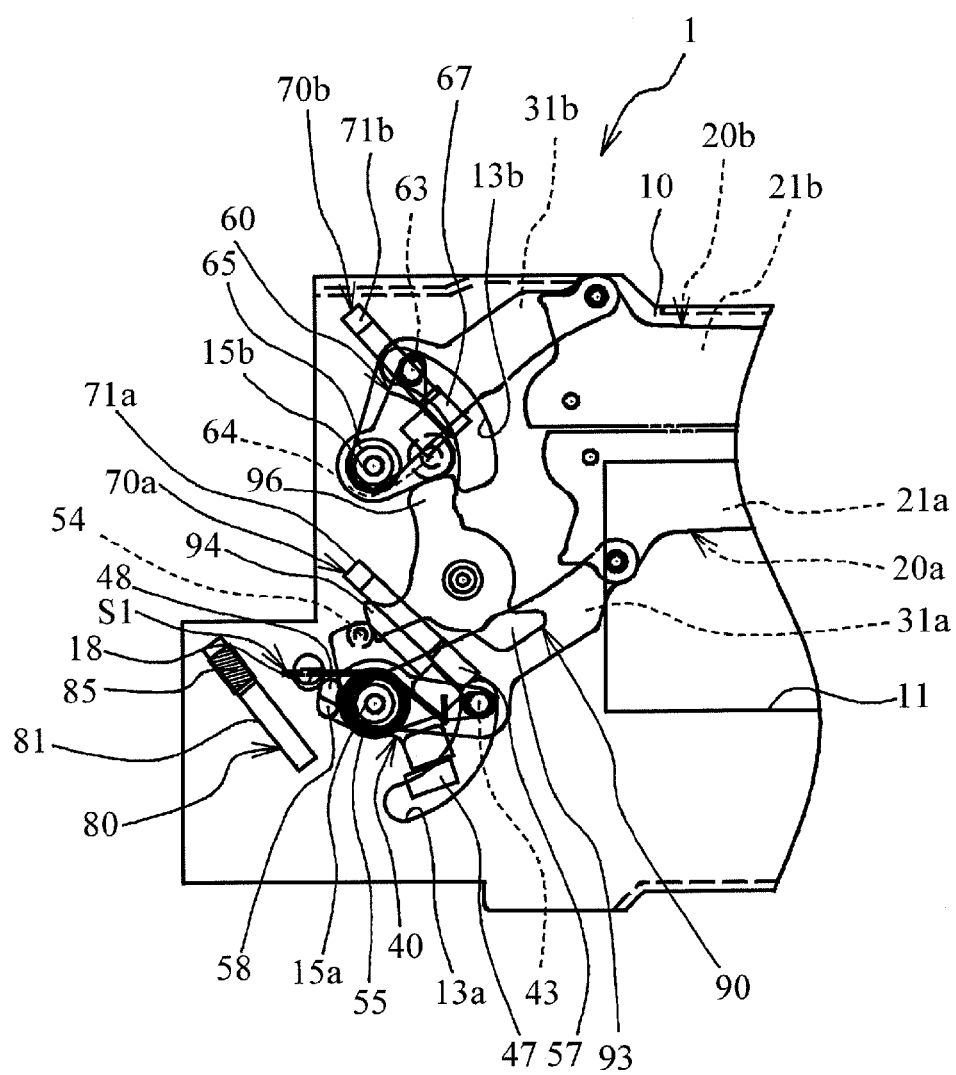
FIG. 10 is an explanatory view of the operation of the focal-plane shutter in the first mode.
Figure 11:
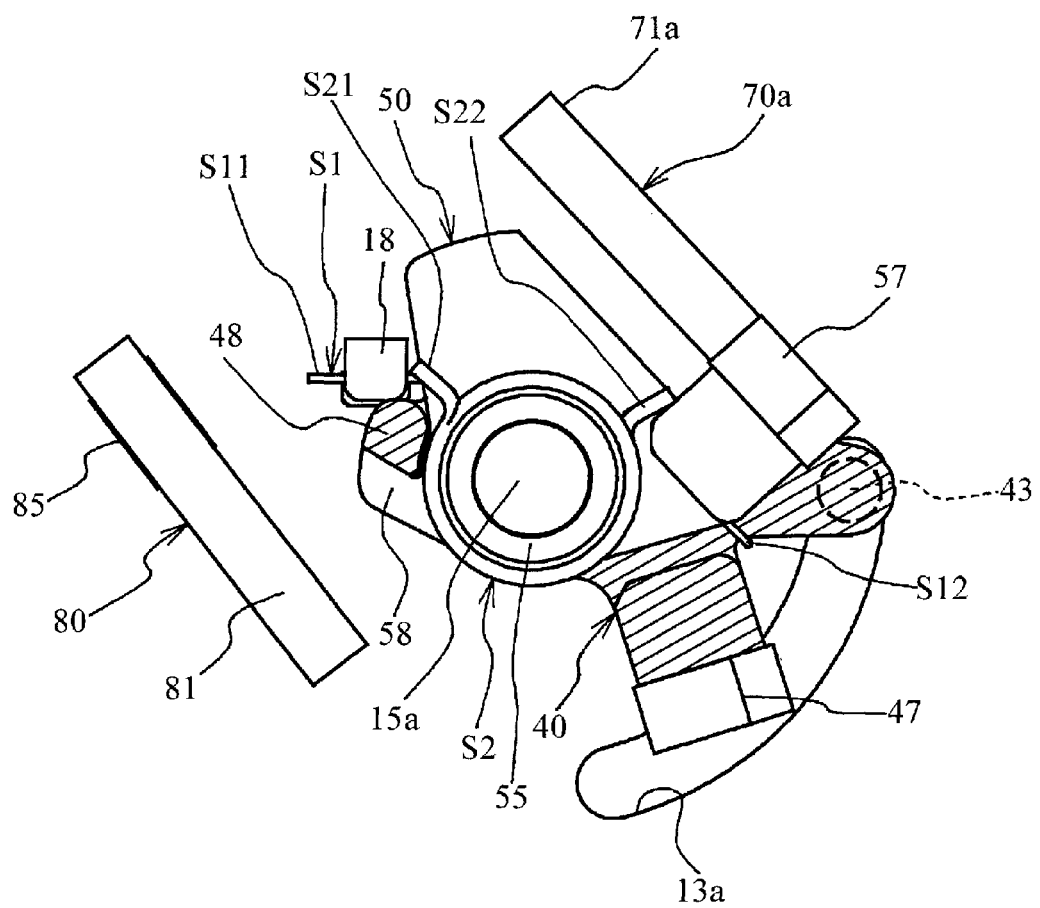
FIG. 11 is an enlarged view around the first lever and the second lever illustrated in FIG. 10.

In this state, a release button of the camera is pushed, so that the coil of the solenoid 80 is energized. Therefore, the magnetic attractive force exerted between the yoke 81 and the movable iron piece 47 is smaller than the biasing force of the spring S1, so that the first lever 40 is rotated counterclockwise by the biasing force of the spring S1 as illustrated in FIG. 10. Thus, the leading blade 20a closes the opening 11. FIG. 11 is an enlarged view around the first lever 40 and the second lever 50 illustrated in FIG. 10. As illustrated in FIG. 11, the engagement portions 48 and 58 abut with each other. The state illustrated in FIGS. 10 and 11 corresponds to a second state of the timing chart illustrated in FIG. 6.

Figure 12:
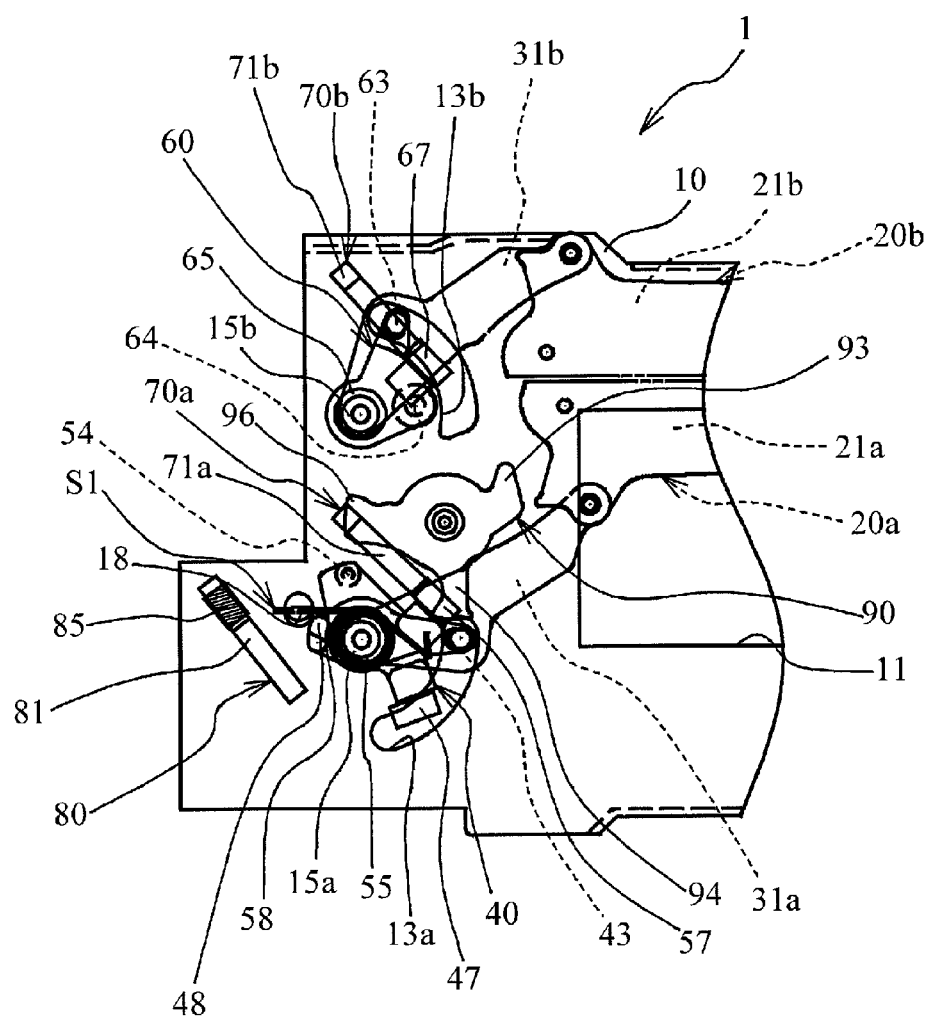
FIG. 12 is an explanatory view of the operation of the focal-plane shutter in the first mode.

Next, the electromagnets 70a and 70b are energized. Therefore, the movable iron pieces 57 and 67 can be respectively adsorbed with the electromagnets 70a and 70b, and then the second lever 50 and the trailing blade drive lever 60 are maintained in the state illustrated in FIG. 10. Next, as illustrated in FIG. 12, the charge member of the camera side pushing the set lever 90 recedes from the set lever 90, and then the set lever 90 is rotated counterclockwise by the biasing force of the return spring and returns to the initial position. Therefore, the pushing portions 94 and 96 recede from the rollers 54 and 64, respectively. The state illustrated in FIG. 12 corresponds to a third state of the timing chart illustrated in FIG. 6.

Figure 13:
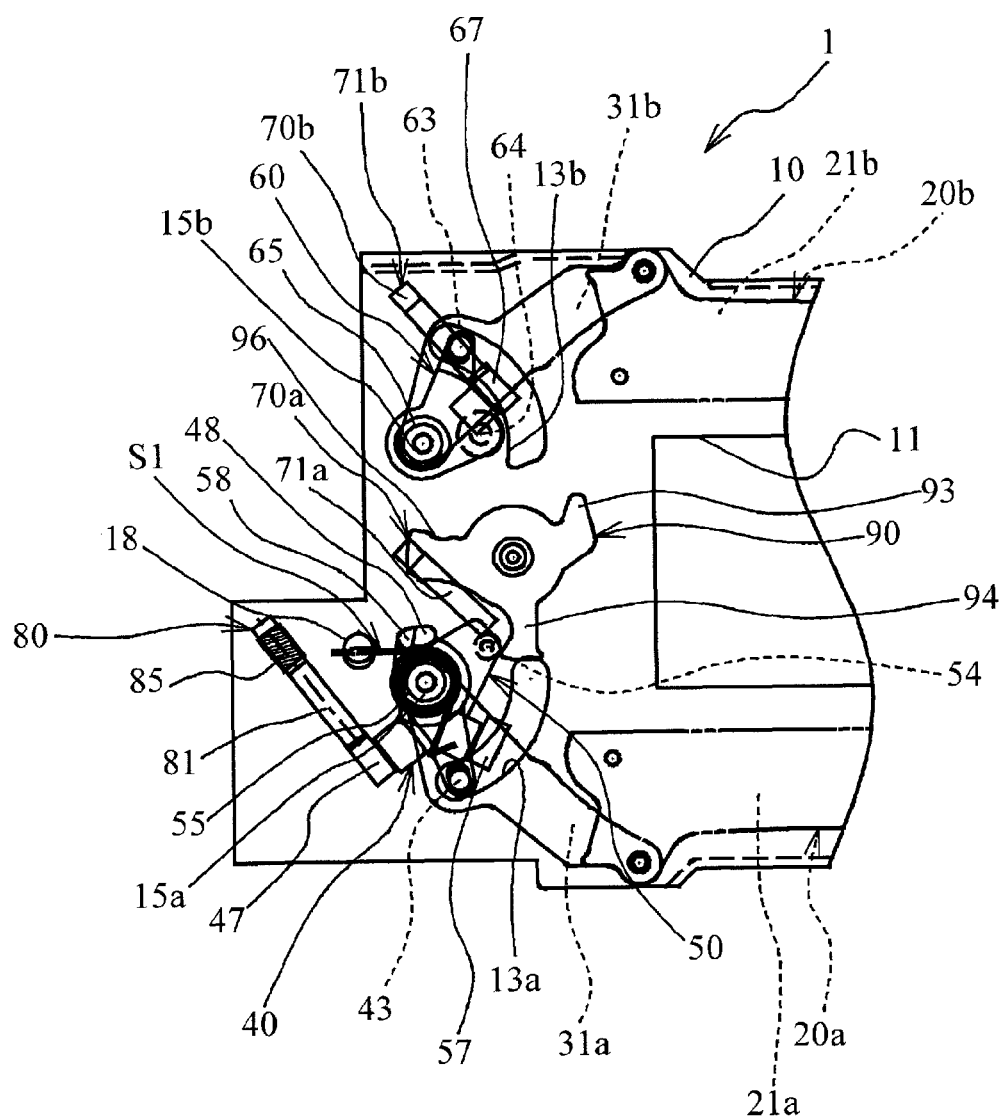
FIG. 13 is an explanatory view of the operation of the focal-plane shutter in the first mode.

Next, the energization of the electromagnet 70a is cut off, so that the first lever 40 and the second lever 50 rotate clockwise together. The leading blade 20a recedes from the opening 11 to open the opening 11. The first lever 40 and the second lever 50 are rotated clockwise by the biasing force of the spring S2. In addition, the spring S2 exerts a force on only the second lever 50. However, since the engagement portion 48 of the first lever 40 and the engagement portion 58 of the second lever 50 engage with each other as illustrated in FIG. 11, the second lever 50 rotates clockwise, and then the engagement portion 58 rotates clockwise and pushes the engagement portion 48 clockwise. Therefore, the first lever 40 rotates clockwise together with the second lever 50. FIG. 13 illustrates an exposing state. The state illustrated in FIG. 13 corresponds to a fourth state of the timing chart illustrated in FIG. 6.

Additionally, at this time, the movable iron piece 47 of the first lever 40 abuts with the yoke 81 of the solenoid 80. When the solenoid 80 is not energized, the magnetic attractive force is exerted between the yoke 81 of the solenoid 80 and the movable iron piece 47. Therefore, the first lever 40 is suppressed from bounding when the movable iron piece 47 abuts with the yoke 81. This can prevent the leading blade 20a from partially closing the opening 11 caused by the bounding of the first lever 40. It is therefore possible to suppress the influence on the image quality by the bounding of the first lever 40.

Next, the energization of the electromagnet 70b is cut off, the trailing blade drive lever 60 is rotated clockwise by the spring not illustrated, and then the trailing blade 20b closes the opening 11. Therefore, the state of the focal-plane shutter 1 returns to the initial state illustrated in FIG. 1. In such a way, the exposure operation is performed in the first mode.

As described above, in the first mode, the second lever 50 and the trailing blade drive lever 60 are set in the state where the opening 11 is opened. Thus, for example, in a case of taking a photograph in a live view mode of displaying outputs from the image pickup element on a liquid crystal monitor or the like in real time, the first mode is suitable.

Figure 14:
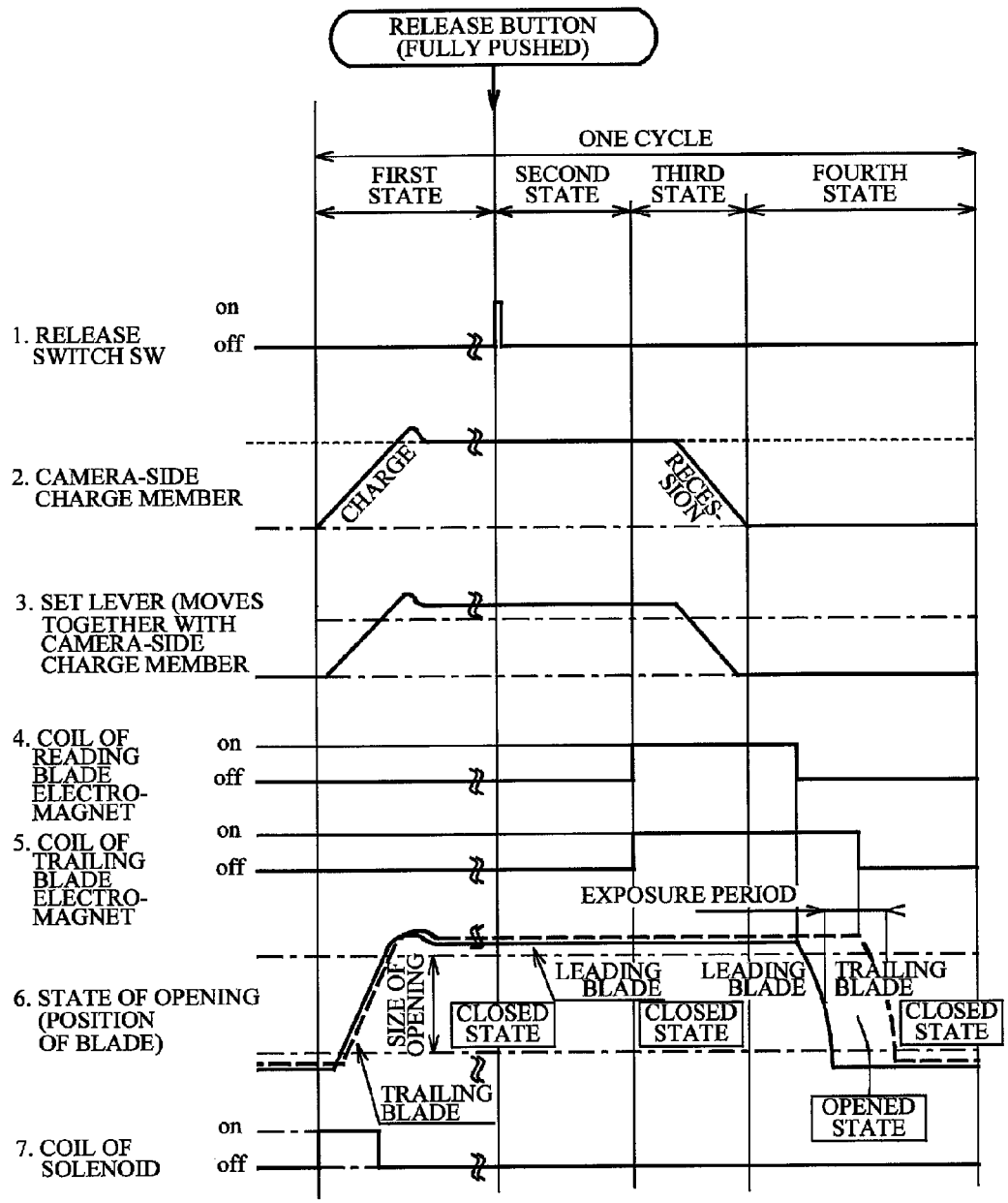
FIG. 14 is a timing chart of the focal-plane shutter in a second mode.
Figure 15:
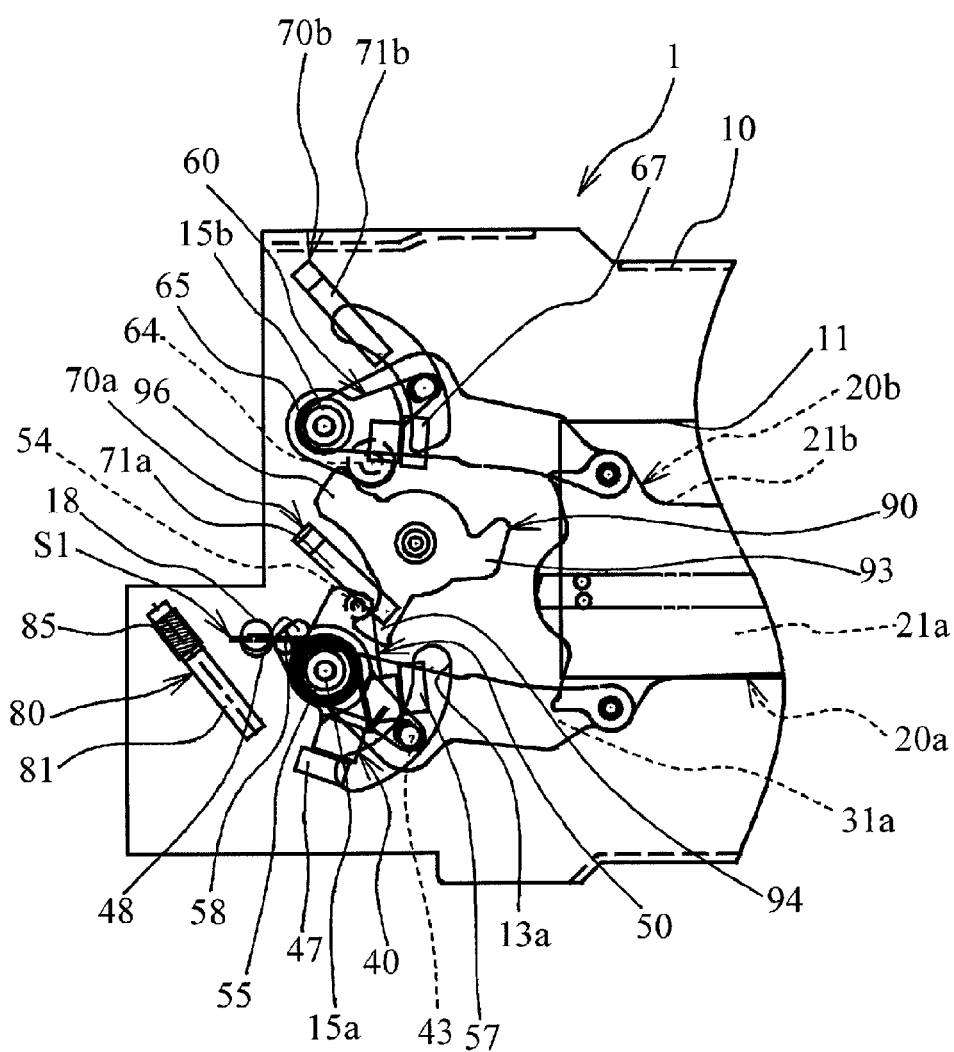
FIG. 15 is an explanatory view of the operation of the focal-plane shutter in the second mode.

Next, the second mode will be described with reference to FIGS. 1, and 14 to 18. FIG. 14 is a timing chart of the focal-plane shutter 1 in the second mode. From the initial state illustrated in FIG. 1, the coil wound around the yoke 81 of the solenoid 80 is energized to cancel the polarities generated in the yoke 81 by the permanent magnet 85. This decreases the magnetic attractive force exerted between the yoke 81 of the solenoid 80 and the movable iron piece 47 of the first lever 40. In this state, the set lever 90 is rotated clockwise by the charge member of the camera side, so that the pushing portions 94 and 96 of the set lever 90 respectively abut with the rollers 54 and 64 to rotate the second lever 50 and the trailing blade drive lever 60 counterclockwise, as illustrated in FIG. 15. At this time, the magnetic attractive force exerted between the yoke 81 and the movable iron piece 47 is decreased, so that the first lever 40 is rotated counterclockwise together with the second lever 50 by the biasing force of the spring S1.

Figure 16:
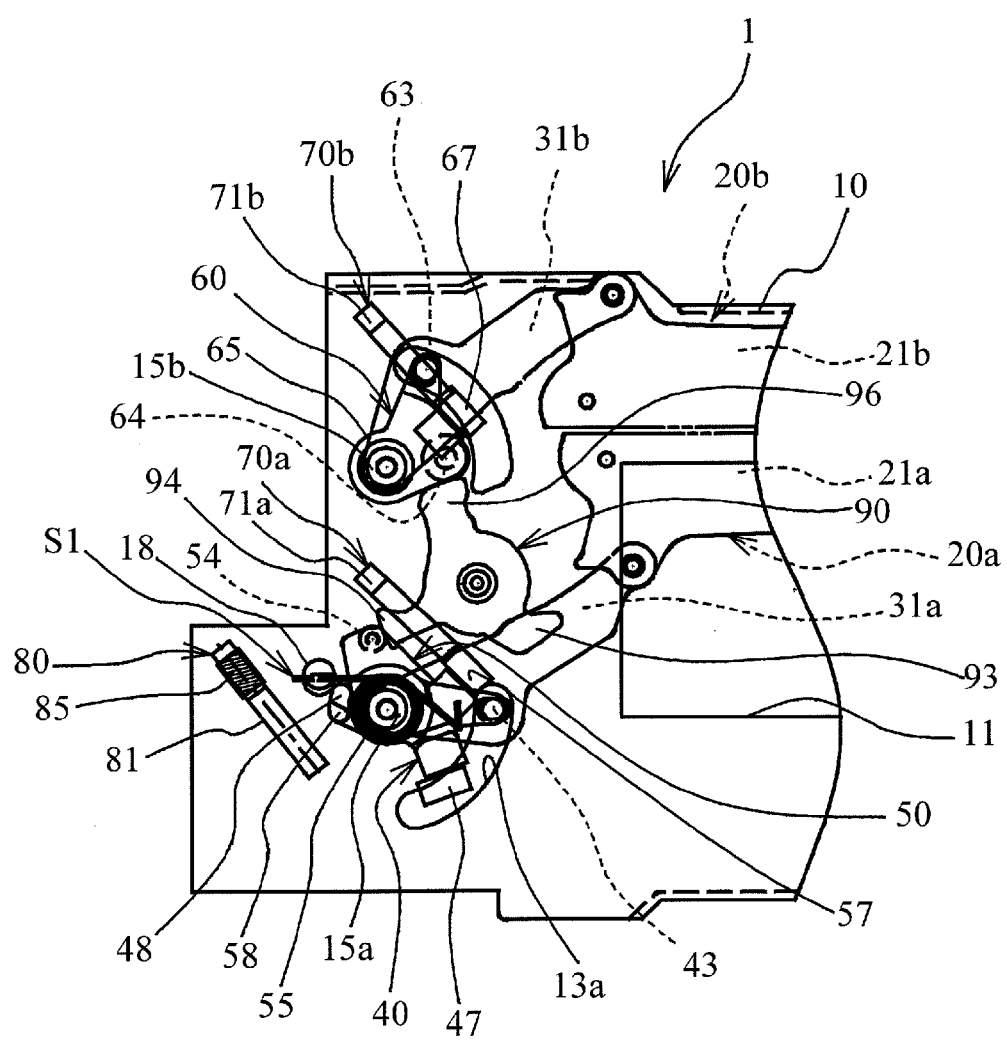
FIG. 16 is an explanatory view of the operation of the focal-plane shutter in the second mode.

Therefore, as illustrated in FIG. 16, the movable iron pieces 57 and 67 respectively abut with the iron cores 71a and 71b. Since the first lever 40 rotates counterclockwise in conjunction with the second lever 50, the leading blade 20a closes the opening 11, and the trailing blade 20b opens the opening 11. In such a way, in the state where the leading blade 20a closes the opening 11 and the trailing blade 20b opens the opening 11, the second lever 50 and the trailing blade drive lever 60 are set. The states illustrated in FIGS. 1, 15, and 16 correspond to a first state of the timing chart illustrated in FIG. 14. Additionally, FIG. 16 is the same as FIG. 10.

Figure 17:
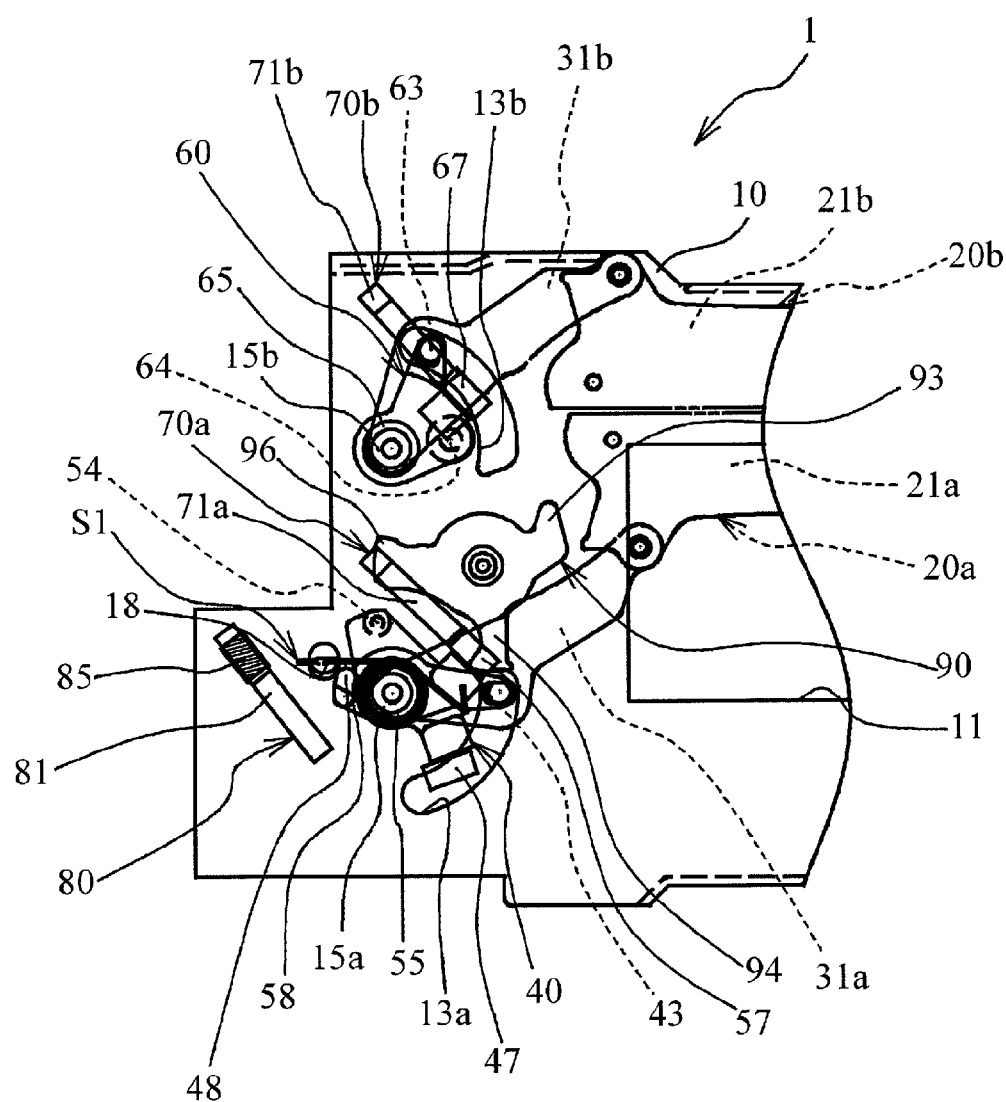
FIG. 17 is an explanatory view of the operation of the focal-plane shutter in the second mode.

Next, when a predetermined period elapses from the time when the release button is pushed, the electromagnets 70a and 70b are energized, and then the movable iron pieces 57 and 67 are respectively adsorbed with the iron cores 71a and 71b (the state corresponding to the second state of the timing chart illustrated in FIG. 14). Next, as illustrated in FIG. 17, the charge member of the camera side recedes from the set lever 90, and the set lever 90 is rotated counterclockwise by the biasing force of the return spring not illustrated and returns to the initial position. The state illustrated in FIG. 17 corresponds to a third state of the timing chart illustrated in FIG. 14. Additionally, FIG. 17 is the same as FIG. 12.

Figure 18:
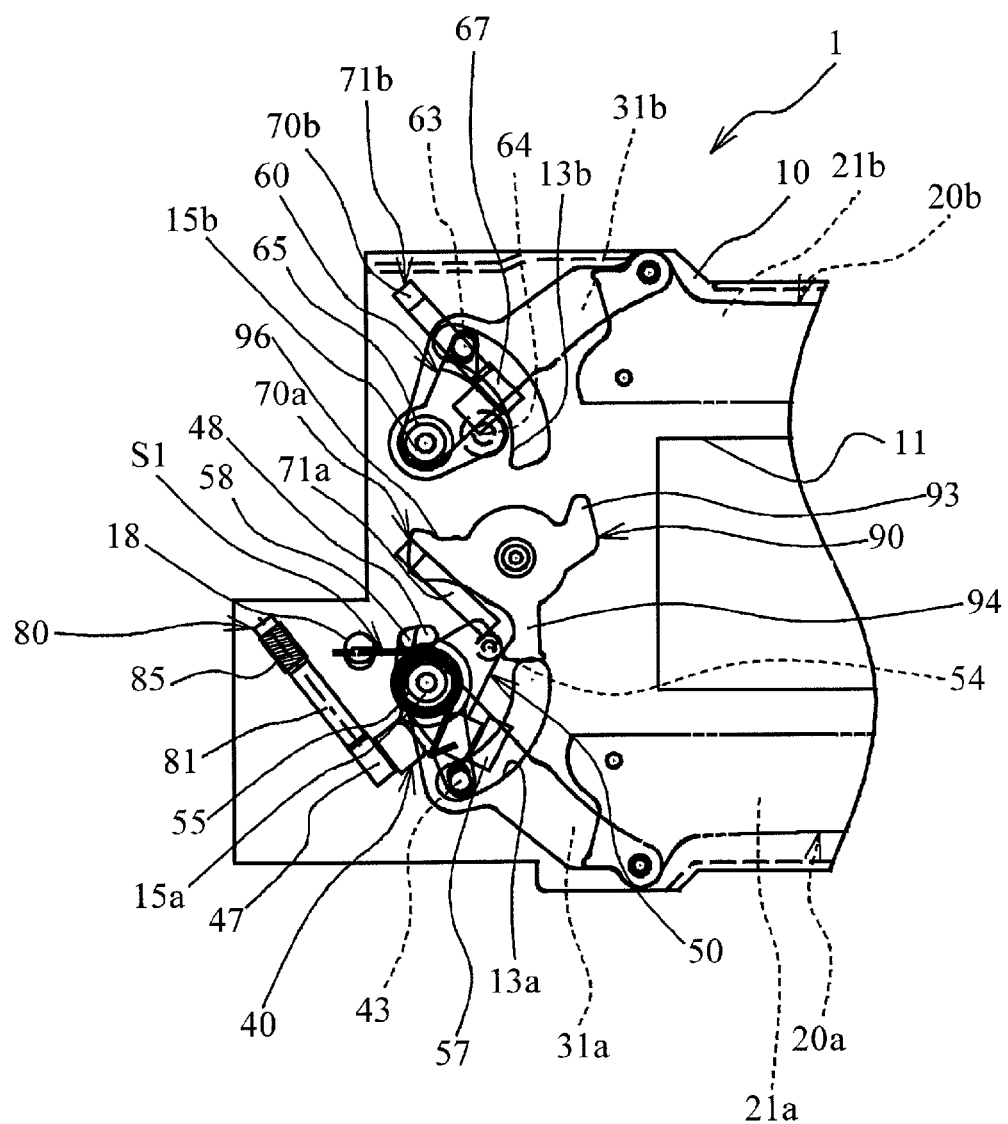
FIG. 18 is an explanatory view of the operation of the focal-plane shutter in the second mode.

Next, the energization of the electromagnet 70a is cut to reduce the magnetic attractive force exerted between the iron core 71a and the movable iron piece 57, so that the second lever 50 is rotated clockwise by the biasing force of the spring S2 as illustrated in FIG. 18. Additionally, at this time, the first lever 40 also rotates clockwise in conjunction with the second lever 50. Therefore, the leading blade 20a recedes from the opening 11 to open the opening 11. The state illustrated in FIG. 18 corresponds to a fourth state of the timing chart illustrated in FIG. 14. Additionally, FIG. 18 is the same as FIG. 13.

Next, the energization of the electromagnet 70b is cut off, so that the trailing blade drive lever 60 rotates clockwise, and then the trailing blade 20b closes the opening 11. The state of the focal-plane shutter 1 returns to the initial state illustrated in FIG. 1. The exposure operation is performed in the second mode in such a way.

As described above, in the second mode, the second lever 50 and the trailing blade drive lever 60 are set in the state where the opening 11 is closed. Thus, for example, in case of continuous shooting, it is little necessary to display outputs from the image pickup element on a liquid crystal monitor or the like at every shooting. Thus, the second mode is suitable for continuous shooting.

Also, in the first mode, as illustrated in FIG. 6, the leading blade 20a starts moving in the set state where the opening 11 is opened, so that the opening 11 is closed. After that, the leading blade 20a recedes from the opening 11 to open the opening 11. Next, the trailing blade 20b closes the opening 11. In this manner, a photograph is taken. However, in the second mode, as illustrated in FIG. 6, the leading blade 20a starts receding from the opening 11 in the set state where the leading blade 20a closes the opening 11, so that the opening 11 is opened. Next, the trailing blade 20b closes the opening 11. In this manner, a photograph is taken. Thus, in the first mode, the leading blade 20a has to close the opening 11 after the set is accomplished, as compared with the second mode. For this reason, in case of continuous shooting, the number of the photographs that can be taken for a predetermined period in the second mode is larger than that in the first mode.

As mentioned above, in the focal-plane shutter 1 according to the present embodiment, the first mode and the second mode can be selectively switched by controlling the energization of the solenoid 80. It is therefore possible to select a mode suitable for a manner of shooting by use of the single focal-plane shutter.

Additionally, the focal-plane shutter 1 according to the present embodiment employs the solenoid 80. For example, it is conceivable to employ an actuator including a stator, a coil, and a rotor, instead of the solenoid 80. However, if such an actuator is employed, the whole size of the device is increased. The focal-plane shutter 1 according to the present embodiment employs the solenoid 80, which can adsorb and hold the first lever 40 when the solenoid 80 is not energized, thereby suppressing an increase in the whole size of the device.

Further, if an actuator including a rotor is employed, rotary torque of the rotor greatly fluctuates depending on a position of the rotor. For this reason, the fluctuation of the rotary torque of the rotor might increase a degree of the fluctuation of the moving speed of the blades moved by the rotor, therefore, image quality might be influenced. In the present embodiment, the first lever 40 is moved by the biasing force of the spring S2, so that the moving speed is substantially constant. Therefore, the moving speed of the leading blade 20a is constant. Thus, in the focal-plane shutter 1 according to the present embodiment, there is little influence on image quality.

Furthermore, if such an actuator is employed, the coil has to be energized every time of rotating the rotor, since the rotor is rotated by energizing the coil. Thus, power consumption might increase. In the focal-plane shutter according to the present embodiment, the solenoid 80 can adsorb and hold the first lever 40 when not energized. The solenoid 80 is energized in only a case of causing the first lever 40 to recede from the solenoid 80, whereby the first lever 40 recedes from the solenoid 80 in accordance with the biasing force of the spring S1. This suppresses power consumption.

Furthermore, if such an actuator is employed, the direction of energization of the coil has to be switched between forward and reverse directions, in order for the rotor to rotate forwardly or reversely. This might make energization control of the coil complicated. The present embodiment employs the solenoid 80, so the direction of energization of the coil of the solenoid 80 has only to be a single direction. This simplifies the energization control of the coil of the solenoid 80.

Also, if such an actuator is employed, the rotor is maintained at a predetermined position by detent torque when the actuator is not energized. Thus, for example, if the impact is applied to the device, the rotor might be rotated and positionally displaced from a predetermined position. In the present embodiment, the magnetic attractive force exerted between the solenoid 80 and the first lever 40 can set greater than the detent torque exerted in the rotor of such an actuator. This prevents malfunction caused by the impact.

While the exemplary embodiments of the present invention have been illustrated in detail, the present invention is not limited to the above-mentioned embodiments, and other embodiments, variations and modifications may be made without departing from the scope of the present invention.

In the first mode, as illustrated in FIG. 6, the leading blade 20a starts moving in the set state where the opening 11 is opened, so the opening 11 is closed. After that, the leading blade 20a recedes from the opening 11 to open the opening 11. Next, the trailing blade 20b closes the opening 11. In this manner, a photograph is taken as exemplarily described above. An electronic leading blade, instead of the leading blade 20a, of the image sensor provided in the camera side, and the trailing blade 20b as only the mechanical shutter, may be used for shooting in an electronic leading blade mode. For example, in the set state where the opening 11 is opened as illustrated in FIG. 6, the leading blade 20a does not move, the image sensor sequentially stores image signals at every pixel lines perpendicular to the moving direction of the trailing blade 20b, and the exposure is performed in synchronization with the mechanical trailing blade 20b which starts closing the opening 11 after a desired exposure period elapses. In such a manner, shooting may be performed. Thus, the exposure is controlled by the mechanical operation of only the traveling of the trailing blade 20b from the shutter fully opening state in the live view mode. It is therefore possible to perform the shooting in a very silent manner. Also, the electronic leading blade mode and the first mode are different from each other only in whether or not the leading blade 20a closes the opening 11 by the first lever 40, specifically, only in whether or not the coil of the solenoid 80 is energized. As described above, the direction of the energization of the coil of the solenoid 80 has only to be a single direction, and the energization control is also simplified. Thus, the first focal-plane shutter according to the present invention is applicable to the electronic leading blade shooting mode of the camera side with ease, in addition to the first mode and the second mode.

In the above embodiment, the spring S1 biases the leading blade 20a to close the opening 11. One end S11 of the spring S1 engages with the board 10 side, and the other end S12 engages with the first lever 40 side. However, the spring S1 is not limited to such a configuration. For example, one end S11 of the spring S1 may engage with the second lever 50 side, the other end S12 of the spring S1 may engage with the first lever 40, and the first lever 40 may be biased to rotate toward the second lever 50 in a state where the second lever 50 is set. For example, one end S11 of the spring S1 may engage with the engagement portion 58, the other end S12 of the spring S1 may engage with the engagement portion 48, and the spring S1 may bias the engagement portion 48 and the engagement portion 58 such that the engagement portion 48 and the engagement portion 58 abut with each other.

For example, an optical equipment including the focal-plane shutter 1 according to the present embodiment is a single-lens reflex camera, a digital camera, or the like. Although the focal-plane shutter 1 according to the present embodiment is applicable to the digital camera, the focal-plane shutter 1 is also applicable to a silver film camera other than the digital camera. That is, the focal-plane shutter 1 according to the present embodiment is applicable to both of the digital camera and the silver film camera, and the shutter can be commonly used for both cameras.

Finally, several aspects of the present invention are summarized as follows.

According to an aspect of the present invention, there is provided a focal-plane shutter including: a board including an opening; a leading blade and a trailing blade capable of opening and closing the opening; a trailing blade lever capable of driving the trailing blade; a first lever connected to the leading blade and capable of driving the leading blade; a second lever arranged coaxially with the first lever, and having an engagement portion abutting with the first lever to push the first lever such that the leading blade opens the opening; a self-holding type solenoid capable of holding the first lever such that the leading blade opens the opening in a state where the self-holding type solenoid is not energized; a leading blade electromagnet and a trailing blade electromagnet respectively capable of holding the second lever and the trailing blade lever in a state where the leading blade electromagnet and the trailing blade electromagnet are energized; and a set lever setting the second lever and the trailing blade lever such that the second lever and the trailing blade lever respectively abut with the leading blade electromagnet and the trailing blade electromagnet, wherein a first mode, where the second lever and the trailing blade lever are set in a state where the leading blade and the trailing blade open the opening, or a second mode, where the second lever and the trailing blade lever are set in a state where the leading blade closes the opening and the trailing blade opens the opening, is selectively switched.

With such a configuration, the self-holding type solenoid is employed instead of an actuator having a rotor, thereby suppressing an increase in size of the focal-plane shutter.

According to another aspect of the present invention, there is provided an optical equipment including the above focal-plane shutter.

What is claimed is:

1. A focal-plane shutter comprising:
   a board including an opening;
   a leading blade and a trailing blade capable of opening and closing the opening;
   a trailing blade lever capable of driving the trailing blade;
   a first lever connected to the leading blade and capable of driving the leading blade;
   a second lever arranged coaxially with the first lever, and having an engagement portion abutting with the first lever to push the first lever such that the leading blade opens the opening;
   a self-holding type solenoid capable of holding the first lever such that the leading blade opens the opening in a state where the self-holding type solenoid is not energized;
   a leading blade electromagnet and a trailing blade electromagnet respectively capable of holding the second lever and the trailing blade lever in a state where the leading blade electromagnet and the trailing blade electromagnet are energized; and
   a set lever setting the second lever and the trailing blade lever such that the second lever and the trailing blade lever respectively abut with the leading blade electromagnet and the trailing blade electromagnet,
   wherein a first mode, where the second lever and the trailing blade lever are set in a state where the leading blade and the trailing blade open the opening, or a second mode, where the second lever and the trailing blade lever are set in a state where the leading blade closes the opening and the trailing blade opens the opening, is selectively switched.

2. The focal-plane shutter of claim 1, wherein
   in the first mode, the second lever is set in a state where the first lever is held by the self-holding type solenoid, and
   in the second mode, the second lever is set in a state where the first lever recedes from the self-holding type solenoid.

3. The focal-plane shutter of claim 1, wherein
   the first lever is biased by a first biasing member such that leading blade closes the opening, and
   the second lever is biased by a second biasing member such that the second lever push the first lever and that the leading blade opens the opening.

4. The focal-plane shutter of claim 3, wherein
   in the first mode, the second lever is set, the first lever is moved by the biasing force of the first biasing member to cause the leading blade to close the opening in a state where the second lever is held by the leading blade electromagnet, and then energization of the leading blade electromagnet is cut off to cause the first lever to move in accordance with the biasing force of the second biasing member against the biasing force of the first biasing member, so that the leading blade opens the opening, and in the second mode, the second lever is set, and then energization of the leading blade electromagnet is cut off to cause the first lever to move in accordance with the biasing force of the second biasing member against the biasing force of the first biasing member, so that the leading blade opens the opening.

5. The focal-plane shutter of claim 4, wherein energization of the leading blade electromagnet is cut off in a state where the second lever is adsorbed with and held by the leading blade electromagnet, and then the second lever is rotated by the biasing force of the second biasing member, so that the first lever abuts with the non-energized self-holding type solenoid.

6. The focal-plane shutter of claim 3, wherein in the first mode, the trailing blade lever is set, and then energization of the trailing blade electromagnet is cut off in a state where the leading blade opens the opening, so that the trailing blade closes the opening.

7. An optical equipment comprising the focal-plane shutter of claim 1.

\* \* \* \* \*